United States Patent [19]

Hiraishi et al.

[11] 4,448,637
[45] May 15, 1984

[54] ETCHING METHOD OF CONDUCTIVE FILM

[75] Inventors: Masanori Hiraishi, Himeji; Masashi Sugata, Hyogo, both of Japan

[73] Assignee: Daicel Chemical Industries, Ltd., Sakai, Japan

[21] Appl. No.: 449,091

[22] Filed: Dec. 13, 1982

[30] Foreign Application Priority Data

Dec. 28, 1981 [JP] Japan ............................. 56-214123
Jun. 25, 1982 [JP] Japan ............................. 57-110356

[51] Int. Cl.³ .......................... C23F 1/02; B44C 1/22; C03C 15/00; C03C 25/06
[52] U.S. Cl. ................................... 156/635; 156/656; 156/664; 156/667; 252/79.4; 252/79.5

[58] Field of Search ............... 156/635, 656, 667, 664, 156/665, 666; 252/79.4, 79.5

[56] References Cited

U.S. PATENT DOCUMENTS 3,483,027 12/1969 Ritzerfeld et al. .................. 156/635
3,647,508 3/1972 Gorrell ............................ 156/635 X
4,348,255 9/1982 Schmidt ......................... 252/79.4 X Primary Examiner—William A. Powell
Attorney, Agent, or Firm—Flynn, Thiel, Boutell & Tanis

[57] ABSTRACT

A conductive film formed on a substrate can be etched by coating an etching solution containing 0 to 30 wt % of polyhydric alcohol and tackified to a viscosity of at least 10 cps.

7 Claims, 1 Drawing Figure

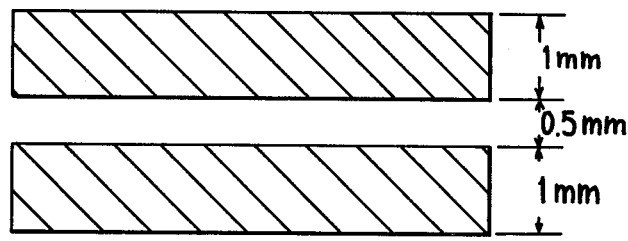

ETCHING METHOD OF CONDUCTIVE FILM

BACKGROUND OF THE INVENTION

1. Field of the Invention

This invention relates to an etching method of a conductive film which remarkably simplifies the etching process in comparison with the conventional photoresist and silk screen methods.

The present invention relates to a method of etching an electrically conductive film on a material consisting of a substrate and the conductive film deposited on the former, and having surface conduction in a desired pattern in accordance with a particular application.

The present invention relates further to an etching solution which is suitable for use in etching the conductive film.

2. Description of the Prior Art

Heretofore known materials having conductive film deposited on a substrate include those which have a metal film such as gold or aluminum film or a metal oxide film such as tin oxide or indium oxide on a substrate such as a glass sheet or a film. According to their construction, they naturally have surface conduction. Some of the materials having the metal or metal oxide film vacuum evaporated on the substrate are transparent and are known as nesa glass and transparent conductive films.

Because of their surface conduction, they are used for flexible circuits, antistatic applications, electromagnetic shield, touch panels, panel heaters, and so forth. Especially those materials which are transparent and electrically conductive have gained a wide application in the field of electronics such as electrodes for liquid crystal display, for light emission in the electric field, for photoelectric sensitive members and the like where transparency and electric conduction are necessary.

In the application described above, it is very seldom that the materials having the surface conduction are used as such without post-treatment. Depending upon the intended application, the conductive portion is etched in a necessary pattern, a conductive paint or a protective coating film is coated on the conductive surface and a tackifier and an adhesive are coated on the conductive surface and non-conductive surface.

To etch the conductive film formed on the substrate, it has been a customary practice to employ a method, which fundamentally forms a mask on the conductive surface, by forming first the mask on the surface of the conductive film and then carrying out etching, by a photoresist process or a screen printing process. The method which forms the mask and then makes etching in accordance with the photoresist process is used for forming electronic circuits such as ICs, while the method which first forms the mask and then makes etching in accordance with the screen printing process is used for an electrode from a copper laminate sheet or the like.

The photoresist process will be described in detail. First, a photosensitive resin layer is deposited on the conductive surface by coating or lamination. The layer is then exposed to ultraviolet light. The pattern portion is crosslinked and becomes insoluble to a solvent; hence, only the portions that are not cross-linked are dissolved and removed by the solvent and the solvent is dried to obtain the mask. Next, the conductive film is removed from the portion where the mask is not formed, by dipping the material into an etching solution or spraying the etching solution to the material, followed then by washing with water and drying. Finally, the material is dipped into a solvent which swells the mask to remove it. After the solvent is dried, etching is completed to provide the desired pattern. Thus, the photoresist process requires a large number of steps.

The silk screen process is practised in the following way. First, a silk screen is prepared to print a masking material for ink or the like in the pattern and the masking material is then printed onto the conductive surface via the silk screen, followed by drying to provide the mask. The subsequent steps are the same as those of the photoresist process and a large number of steps are also necessary. The silk screen method can produce large quantities of masks on the conductive surface within a short period of time. For this reason, this process makes a greater contribution to the reduction of etching cost than the photoresist but the etching cost itself is still high because the subsequent steps are large.

SUMMARY OF THE INVENTION

The inventors of the present invention have made intensive studies in search of an etching method which can improve the complicated conventional etching method of thin films such as photoresist and silk screen and which can easily reduce the etching cost. As a result, the inventors have found that if the viscosity is increased, the heretofore known etching solution can be coated and if this thickened etching solution is directly coated on the conductive film via the silk screen, for example, and is then washed merely with water, the electrically conductive film can be etched in a desired pattern. The present invention is completed on the basis of this finding.

In other words, the gist of the present invention resides in an etching method of a conductive film characterized in that a conductive film deposited on a substrate is etched by applying an etching solution which is thickened to a viscosity of at least 10 cps.

Since the mask is fundamentally unnecessary in the present invention as described above, the steps relating to the formation and removal of the mask can be all eliminated so that the etching steps are markedly simplified and the etching cost is reduced remarkably.

Hereinafter, the present invention will be described in detail. As the electrically conductive film in the invention, an electrically conductive layer having a thickness of up to 5,000 Å and formed on the substrate is preferred. If the layer is more than 5,000 Å thick, the etching time becomes too long in the etching method of the present invention. Examples of the materials for the conductive film include various metals such as aluminum, zinc, iron, nickel, tantalum, copper, gold, silver, cobalt and the like, metal oxides such as tin oxide and indium tin oxide and other conductive materials such as copper iodide and titanium nitride.

To form the conductive film on the substrate, it is possible to employ various methods such as vacuum evaporation, chemical plating, electroplating, chemical coating and the combination of these methods. However, vacuum evaporation is most suitable because it provides uniform film thickness, is easy to practise and provides good adhesion between the substrate and the conductive film. Vacuum evaporation includes various methods such as vacuum evaporation, RF and DC sputtering, reactive sputtering, ion plating, and the like. A suitable method is selected from them in view of the material to form the conductive film, the properties required for the conductive film and the cost of production.

The conductive film may have an under coating layer or a top coating layer, whenever necessary.

In the present invention, any materials may be used as the substrate for the conductive film so long as they can withstand the condition of forming and etching the conductive film. Examples include organic type polymer substrates, inorganic type substrates, paper, their composite molded articles, and so forth. Examples of the organic polymer substrates include the substrates of thermoplastic resins such as polyethylene terephthalate, polyethylene naphthalate, acrylic resins, polyacetal, polysulfone, styrene resin, ABS, polyamide, polyethylene, polypropylene and the like; and the substrates of thermosetting resins such as epoxy, silicone, unsaturated polyester, diallyl phthalate, phenol, urea, and so forth. Examples of the inorganic substrates include vitreous substrates such as soda glass, borosilicate glass, and the like, ceramic substrates such as alumina, magnesia, zirconia, silica and the like, metal oxides and semiconductors of various compounds.

DESCRIPTION OF THE PREFERRED EMBODIMENTS

Next, the method of preparing the thickened etching solution to be used in the present invention will be described. The etching solution is generally an aqueous solution. The thickening methods using this property are as follows: (1) a method which dissolve a water-soluble polymer in the etching solution, (2) a method which adds an aqueous type emulsion to the etching solution, (3) a method which adds fine particles of inorganic and organic polymers to the etching solution, and the con-joint use of these methods.

Examples of the water-soluble polymers to be used in the method (1) include cellulose type polymers such as carboxymethyl cellulose, hydroxyethyl cellulose, starch, and the like and synthetic polymers such as polyacrylic acid, polyvinyl alcohol, water-soluble nylon, and the like. When these polymers are dissolved in the etching solution, they dissolve in the molecular form and provide a great thickening effect, thus increasing the viscosity of the etching solution to a considerable extent. Accordingly, the conductive film can be easily etched in a fine pattern using the etching solution thickened by the water-soluble polymer by hand-writing or silk screen process. This method is most preferred.

As the aqueous type emulsion to be used in the method (2), mention can be made of the nonionic type, the cation type and the anion type. Almost all synthetic polymers that are emulsified can be used for this purpose. Definite examples include the emulsion of polyvinylidene chloride that is used for packaging foodstuffs, the emulsion of an acrylic type thickener used as the adhesive, the emulsion of a rubber type thickener and the ABS emulsion. These aqueous type emulsions preferably have small particles and can be coated on the conductive film by hand writing or silk screen and be then etched. However, the method (2) is considerably inferior to the method (1) using the etching solution thickened by the water-soluble polymer because the viscosity of the etching solution can not be much increased, careful coating conditions must be selected for coating the etching solution as the emulsion particles consist of the aggregate of molecules and have a certain size, and etching of a fine pattern is difficult.

The third method (3) of thickening the etching solution by use of inorganic and organic fine particles provides a smaller effect and when the particles are great, it becomes difficult to use the silk screen method and to etch a fine pattern. However, this method is effective for etching the conductive film in a simple pattern by hand writing.

Incidentally, all these three methods (1) through (3) can be used in combination.

The etching solutions whose viscosity is to be increased in the present invention are aqueous solutions of oxidizing and reducing agents and are generally inorganic aqueous solutions. Examples include aqueous solutions of strong acids such as aqua regia and hydrochloric acid, aqueous solutions of weak acids such as thiosulfuric acid and acetic acid, aqueous solutions of strong bases such as caustic soda and caustic potash, aqueous solutions of weak bases such as sodium sulfate and sodium phosphite, aqueous solution of salts of strong acids and strong bases such as NaCl and KI, and acidic aqueous solutions such as ferric chloride. They are suitably selected in accordance with the kind of the conductive films to be etched. For etching the metallic films, for example, aqua regia, an aqueous solution of hydrochloric acid, aqueous solutions of alkali metal hydroxides and alkali metal sulfides, and the like, are used as the etching solution. An aqueous solution of nitric acid is used for etching the silver film and aqueous sulfuric acid solution, for the copper film. An aqueous caustic soda solution is used for etching the aluminum film. For etching an indium-tin oxide film, a dilute aqueous hydrochloric acid solution or an acidic aqueous solution of ferric chloride is used.

The etching solution thickened in the manner described above must have a viscosity of at least 10 cps and the amount of addition of the water-soluble polymer is selected to accomplish this object. When the etching solution is thickened preferably to a viscosity of 100 cps or more, it can be easily coated on the conductive film by hand writing or silk screen and etching can be made in a desired pattern.

If the viscosity is below 10 cps, the etching solution flows and changes even after coated by hand writing or silk screen and etching of the conductive film can not be made in a desired pattern.

When the viscosity of the etching solution becomes great, coating by hand writing first becomes impossible. In such a case, it is possible to coat the etching solution by squeezer by silk screen and etching of the conductive film can be made in a desired pattern. When the etching solution becomes highly viscous and comes to have a structural viscosity, etching of the conductive film can also be made so that there is no upper limit to the viscosity of the etching solution to be thickened. However, as the amount of addition of the additive increases with an increasing viscosity of the etching solution, the etching capacity of the etching solution drops. It is therefore preferred that the amount of addition of the water-soluble polymer, the aqueous type emulsion or the fine particles be up to 50 wt% on the basis of the etching solution. A preferred range of the amount of addition is from 0.01 wt% to 30 wt%.

Hand writing is most easy to practise as the method of coating the thickened etching solution to the conductive film but etching in a considerably fine pattern can be made by silk screen. Other methods include a spray method in which a mask produced by etching an aluminum sheet or the like is placed on the conductive film and the etching solution is sprayed thereon. Continuous coating can be made by use of a gravure coater or a reverse roller coater.

The coating method of the thickened etching solution in accordance with the present invention needs a little longer etching period of time than methods using the conventional etching solution. However, since the method of the present invention provides the advantages that the etching solution tank is not necessary and the conductive film can be left at an arbitrary place unlike the conventional method and hence, the etching time in practice can be shortened, on the contrary, when etching in large quantities is to be executed.

The thickened etching solution can be washed extremely simply by dipping it into water or hot water or spraying water or hot water. If the water washing speed is low, peripheral portions of the portion coated wit the etching solution would be etched during washing with water; hence, the spray method of water or hot water is preferred in order to obtain an accurate pattern with an increasing water washing speed.

However, the etching solution of the present invention need not always be washed with water after etching. For instance, when the etching solution thickened by the water-soluble polymer is coated on the conductive film and a certain period of time passes, breakage of the conductive film at the coated portion finishes and is electrically insulated. If the film is dried as such, it becomes like a switching device such as a touch panel in which a spacer is disposed simultaneously with etching. Similarly, when an etching solution thickened by an acrylic type emulsion is coated on the conductive film and is dried for a certain period of time without washing with water, the film provides the same effect as when an adhesive is applied to the spacer described above or to a panel heater simultaneously with etching. Thus, when the etching method of the present invention is used, an unexpected effect can be obtained in the post-treatment of the surface-conductive laminate formed by the conductive film.

A good effect can be obtained in obtaining a satisfactory etching pattern by coating the thickened etching solution of the present invention on the conductive film after a mask is applied to the conductive film. This is because the etching solution does not penetrate into the conductive film and does not etch the unnecessary portion from below the mask as in the case of the conventional etching solution since the viscosity of the etching solution in the present invention is high.

Though the tackified etching solution can sufficiently accomplish the object of the present invention, greater effects can be obtained by further adding a polyhydric alcohol to the etching solution because it prevents the evaporation of the water content of the aqueous etching solution and the increase of the viscosity during coating and thus prevents the abnormally thickened etching solution from causing clogging during screen printing.

The additive for giving the water retaining property to the thickened etching solution to be used in the present invention is limited only to the polyhydric alcohol. Phase separation would occur if monohydric alcohols such as methanol, ethanol and butanol are added to the etching solution.

Examples of polyhydric alcohols to be added include dihydric alcohols such as ethyleneglycol, diethyleneglycol and triethyleneglycol and trihydric alcohols such as glycerin. Among them, ethyleneglycol and glycerin are used preferably.

The amount of addition of the polyhydric alcohol in the present invention varies with the thickened etching solution, but it is generally at least 0.1 wt% and up to 30 wt%. If the amount is below 0.1 wt%, the effect of providing the water retaining property as the effect of the present invention is less and if it is above 30 wt/%, on the other hand, the viscosity of the thickened etching solution changes remarkably and phase separation is also likely to occur easily. Within the range described above, the polyhydric alcohol can easily dissolve in the etching solution. The viscosity of the etching solution of the present invention is extremely stable with the passage of time and hardly causes clogging when screen-printed.

BRIEF DESCRIPTION OF THE DRAWING

The drawing is a plan view of the mask applied on the surface of the gold film in order to confirm completion of etching when the gold film is etched.

The portions indicated by oblique lines represent the portions where the gold film remains after etching due to the mask.

DESCRIPTION OF THE INVENTION

Hereinafter, the present invention will be described in further detail with reference to examples thereof.

EXAMPLE 1

A gold film was vacuum evaporated on a commercially available polyester film (125 μm thick) by RF sputtering (using "SPF-210H" of Nichiden Anelva Co.) in a thickness of 100 Å. Next, a commercially available water-soluble polymer, "HEC" (hydroxyethylcellulose, product of Daicel Chemical Industries, Ltd. QP-52000A) was dissolved in a 25 wt% aqueous solution of sodium sulfide in a ratio of 25 wt% to prepare ink (thickened etching solution) for silk screen. The ink was printed on the vacuum evaporation surface of the gold vacuum evaporation film using a silk screen plate so that the portions of oblique lines in FIG. 1 did not pass the ink. After 20 seconds from printing, the ink was washed with water and the gold film was removed only from the portion where the ink was coated. The pattern printed by the ink of the present invention using the silk screen plate was substantially the same as the screen pattern. The oblique portions in FIG. 1 were completely insulated electrically and this showed that etching was effected completely.

EXAMPLE 2

An indium tin oxide film (tin oxide content=6 wt%) was vacuum evaporated on a commercially available polyester film ("Dia-foil," 125 μm thick) by RF sputtering in a thickness of 300 Å. Next, the water-soluble polymer HEC used in Example 1 was dissolved in a ferric chloride solution which was acidic by hydrochloric acid, in a ratio of 25 wt% to prepare ink. The resulting ink was printed on the indium tin oxide film using the silk screen plate of Example 1. One minutes later, the ink was washed with water and the indium tin oxide film was etched substantially in conformity with the silk screen pattern. The gap between the oblique line portions in FIG. 1 was completely insulated electrically.

Comparative Example 1

A 25 wt% aqueous solution of sodium sulfide was printed on the film of Example 1 produced by vacuum evaporating a 100 Å thick gold film on the polyester film of Example 1, using the silk screen plate used in Example 1. The etching solution fluidized after printing and etching could not be made in accordance with the pattern.

Comparative Example 2

An aqueous solution of ferric chloride which was acidic by hydrochloric acid (Baumé degree=42) was printed on the film of Example 1 produced by vacuum evaporating a 300 Å thick indium tin oxide film on the polyester film of Example 1, using the silk screen plate of Example 1. The etching solution fluidized after printing and etching could not be made in accordance with the pattern.

EXAMPLE 3

Various kinds of ink were prepared by dissolving the water-soluble polymer "HEC" of Example 1 in a 5 wt% aqueous solution of sodium sulfide in varying ratios. Using these inks, various films produced by vacuum evaporating a 100 Å thick gold film on the polyester film of Example 1 were etched in the same way as in Example 1. As a result, it was found that when the ink viscosity was below 10 cps, the ink fluidized after printing and etching could not be made in accordance with the pattern, and when the HEC concentration was 50 wt% or more, printing could not be made in accordance with the pattern of the silk screen plate, the etching speed was low and etching could not be made in accordance with the pattern.

EXAMPLE 4

Various inks were prepared by dissolving CMC (carboxymethylcellulose, product of Daicel Chemical Industries, Ltd., Type 200, for printing) or starch in a 25 wt% aqueous solution of sodium sulfide in a ratio of 25 wt%. Using these inks, the film produced by vacuum evaporating a 100 Å thick gold film on the polyester film of Example 1 was etched in the same way as in Example 1. It was found that etching was satisfactorily possible from the aspect of picture quality as well as from the aspect of electric characteristics. The time after printing til washing with water of the ink was sufficiently as short as within one minutes in all cases.

EXAMPLE 5

Various inks were prepared by dissolving the water-soluble polymer "HEC" used in Example 1 in aqua regia (concentrated nitric acid 7: concentrated hydrochloric acid 3), a 15 wt% aqueous solution of NaOH and a 10 wt% aqueous solution of HCl in the ratio of 25 wt%, respectively. The film prepared by vacuum evaporating a 100 Å thick gold film on the polyester film used in Example 1 was etched using these inks in the same way as in Example 1. Etching could be made satisfactorily from the aspect of picture quality as well as from the aspect of electric characteristics. However, the time after printing till washing with water, or the so-called etching time was 1 minute for aqua regia, 30 minutes for the aqueous NaOH solution and 10 minutes for the aqueous HCl solution.

EXAMPLE 6

Copper and aluminum were vacuum evaporated on commercially available glass slides for microscopes in a thickness of 100 Å, respectively, to obtain films. Using ink prepared by dissolving the water-soluble polymer "HEC" of Example 5 in a 15 wt% aqueous NaOH solution, the films were etched in the same way as in Example 1. Etching could be made satisfactorily from the aspect of picture quality as well as from the aspect of electric characteristics. The etching time after printing till washing with water was 10 minutes for copper and 5 minutes for aluminum.

EXAMPLE 7

Ink was prepared by dissolving an acrylic type emulsion (CEVIAN A, No. 5821, a product of Daicel Chemical Industries, Ltd.) in sodium sulfide in a ratio of 5 wt%. The ink was printed on a film produced by vacuum evaporating a 100 Å thick gold film on the polyester film of Example 1, using the silk screen plate used in Example 1. At one minute after printing, conduction between the portions of oblique lines in FIG. 1 was examined using a tester, without washing the printed film. It was found to be completely insulated electrically.

Next, the testpiece was placed in an oven held at 100° C. to dry the water content of the ink. Since the ink showed the viscosity, the etched sample could be bonded to glass sheet or the like.

EXAMPLE 8

A tackified etching solution was prepared by dissolving a commercially available water-soluble polymer "HEC" (hydroxyethylcellulose, a product of Daicel Chemical Industries, Ltd., QP-52000A) in a 10 wt. % aqueous hydrochloric acid solution in a ratio of 25 wt. %.

Next, 5 wt% of glycerin was added to the etching solution to prepare ink for screen printing. The ink to which glycerin was added was coated on the conductive surface of a transparent conductive film (CELEC K-EC, a product of Daicel Chemical Industries, Ltd.) produced by vacuum evaporating an indium tin oxide to a biaxially stretched polyethylene terephthalate film, using a screen plate having a predetermined pattern. After one minute from printing, the ink was washed with water. The indium tin oxide was removed from the portion coated with the ink and etching could be accomplished. Etching could be made even after printing was repeated many times. When printing was interrupted and was started again after 10 minutes, no clogging occurred on the screen plate and etching could be started again. No change was observed in the viscosity of the ink even when it was left standing in the air for 10 days.

Comparative Example 3

In the same way as in Example 8, the water-soluble polymer "HEC" was dissolved in a 10 wt% aqueous solution of hydrochloric acid in the ratio of 25 wt% to prepare ink for screen printing. The ink was printed on the transparent conductive film in the same way as in Example 8 without adding glycerin to the ink. At one minute after printing, the ink was washed with water and etching could have been accomplished. Etching could be made smoothly and accurately so long as printing was repeated without interruption. However, when printing was interrupted and again started after 10 minutes, clogging occurred at almost all portions of the screen plate and the screen plate had to be washed. When the ink was left standing in the air for 10 days, a hard film occurred on the surface and the viscosity increased as a whole.

EXAMPLE 9

20 wt% of starch was dissolved in a 20 wt% aqueous solution of sodium hydroxide and the mixture was heated to increase the viscosity. Furthermore, 5 wt% of a ethyleneglycol was added and dissolved to prepare ink for silk screen.

Next, the ink was coated on the conductive surface of a transparent conductive film (CELEC G-34FX, a product of Daicel Chemical Industries, Ltd.) produced by vacuum evaporating gold on a biaxially stretched polyethylene terephthalate, in the same way as in Example 8. The ink was washed with water at 30 seconds after printing. Gold was removed from the portion where the ink was coated and etching could have been accomplished. Even when printing was repeated many times, etching could be made smoothly. When printing was interrupted and was started again after the passage of 10 minutes, no clogging occurred on the silk screen plate and etching could be started again. Hardly any change occurred in the viscosity even after the ink was left standing in the air for 10 days.

Comparative Example 4

In the same way as in Example 9, 20 wt% of starch was dissolved in a 10 wt% aqueous solution of sodium hydroxide to prepare ink for silk screen printing. The ink was coated on the transparent conductive film in the same way as in Example 9 without adding ethyleneglycol to the ink. At 30 seconds after printing, the ink was washed with water and etching could have been accomplished. Etching could be made smoothly so long as printing was repeated many times without interruption. However when printing was interrupted and was again started after 10 minutes, clogging occurred at almost all portions of the screen plate and the plate had to be washed. When the ink was left standing in the air for 10 days, a hard film occurred on the surface and the viscosity increased as a whole.

What is claimed is:

1. A method of producing a pattern of an electrically conductive film on a substrate comprising: providing a substrate coated with a continuous layer of an electrically conductive material; depositing an etchant composition on selected areas of said layer, said etchant composition consisting essentially of an aqueous solution of an etching agent effective for reacting with said electrically conductive material to form water-soluble reaction products, said aqueous solution containing dissolved therein from 0.01 to 30% by weight of a water-soluble organic polymer effective to increase the viscosity of said composition to at least 10 cps, said aqueous solution also containing dissolved therein up to 30% by weight of a polyhydric alcohol capable of preventing the evaporation of water from said etchant composition; maintaining said etchant composition on said selected areas of said layer until said etching agent has reacted with said electrically conductive material to form water-soluble reaction products; and then applying water to remove said etchant composition and said water-soluble reaction products from said layer.

2. The method as defined in claim 1 wherein said water-soluble polymer is a member selected from the group consisting of cellulose polymers, polyacrylic acid polymers, polyvinyl alcohol, polyamides and starch.

3. The method as defined in claim 1 wherein said polyhydric alcohol is a dihydric or trihydric alcohol.

4. A method as defined in claim 1 in which said water-soluble polymer is hydroxyethyl cellulose.

5. A method as defined in claim 1 in which said water-soluble polymer is carboxymethyl cellulose.

6. A method as defined in claim 1 in which said water-soluble polymer is starch.

7. A method as defined in claim 1 in which said polyhydric alcohol is selected from the group consisting of ethylene glycol, diethylene glycol, triethylene glycol and glycerin.

* * * * *